(12) United States Patent
Lee et al.

(10) Patent No.: US 12,309,768 B2
(45) Date of Patent: May 20, 2025

(54) METHOD AND COMMUNICATION APPARATUS FOR TRANSMITTING SCHEDULING REQUEST INFORMATION

(71) Applicant: LG ELECTRONICS INC., Seoul (KR)

(72) Inventors: Hyunho Lee, Seoul (KR); Seonwook Kim, Seoul (KR); Hanjun Park, Seoul (KR); Changhwan Park, Seoul (KR); Duckhyun Bae, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 699 days.

(21) Appl. No.: 17/280,143

(22) PCT Filed: Sep. 27, 2019

(86) PCT No.: PCT/KR2019/012580
§ 371 (c)(1),
(2) Date: Mar. 25, 2021

(87) PCT Pub. No.: WO2020/067762
PCT Pub. Date: Apr. 2, 2020

(65) Prior Publication Data
US 2021/0345370 A1    Nov. 4, 2021

(30) Foreign Application Priority Data

Sep. 27, 2018 (KR) .................. 10-2018-0115295
Feb. 15, 2019 (KR) .................. 10-2019-0017797
Jul. 4, 2019 (KR) .................. 10-2019-0080801

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 4/40* (2018.02); *H04W 72/0446* (2013.01); *H04W 72/21* (2023.01)

(58) Field of Classification Search
CPC .............. H04W 72/1268; H04W 4/40; H04W 72/0446; H04W 72/21; H04L 1/1812
See application file for complete search history.

(56) References Cited

U.S. PATENT DOCUMENTS

2017/0374675 A1* 12/2017 Hwang .............. H04W 72/04
2018/0359057 A1* 12/2018 Yang ................ H04L 1/1861
(Continued)

FOREIGN PATENT DOCUMENTS

WO    2016108666    7/2016

OTHER PUBLICATIONS

PCT International Application No. PCT/KR2019/012580, International Search Report dated Jan. 23, 2020, 18 pages.
(Continued)

*Primary Examiner* — Jackie Zuniga Abad
(74) *Attorney, Agent, or Firm* — LEE, HONG, DEGERMAN, KANG & WAIMEY

(57) ABSTRACT

The present specification relates to a wireless communication system and to a method and apparatus therefor, the method comprising: when a plurality of physical uplink control channels (PUCCHs) for a plurality of scheduling requests (SRs) and a first PUCCH comprising first uplink control information (UCI) are overlapped in a time domain, mapping, to specific resource elements (REs) among REs of the first PUCCH, SR information associated with the plurality of SRs; and transmitting the first PUCCH to which the SR information is mapped.

7 Claims, 13 Drawing Sheets

SR resource configured

REs for SR

(51) Int. Cl.
*H04W 4/40* (2018.01)
*H04W 72/0446* (2023.01)
*H04W 72/21* (2023.01)

(56) References Cited

U.S. PATENT DOCUMENTS

| | | | |
|---|---|---|---|
| 2019/0230683 A1* | 7/2019 | Akkarakaran | H04W 72/1268 |
| 2019/0261391 A1* | 8/2019 | Kundu | H04L 1/0073 |
| 2019/0327759 A1* | 10/2019 | Lee | H04W 72/1268 |
| 2020/0252185 A1* | 8/2020 | Zhang | H04L 5/001 |
| 2020/0288458 A1* | 9/2020 | Takeda | H04L 1/1861 |
| 2021/0329623 A1* | 10/2021 | Yoshioka | H04L 1/0003 |

OTHER PUBLICATIONS

Nokia et al., "Remaining open items on long PUCCH," R1-1804459, 3GPP TSG-RAN WG1 #92bis, Apr. 2018, 8 pages.
Qualcomm Incorporated, "Remaining issues for long PUCCH," R1-1804803, 3GPP TSG RAN WG1 Meeting #92bis, Apr. 2018, 9 pages.
ZTE et al., "Issues related to Long PUCCH," R1-1805262, 3GPP TSG RAN WG1 Meeting #92b, Apr. 2018, 10 pages.
Huawei et al., "Review Summary for AI 7.1.3.2 related to long PUCCH," R1-1809802, 3GPP TSG RAN WG1 Meeting #94, Aug. 2018, 35 pages.

* cited by examiner

METHOD AND COMMUNICATION APPARATUS FOR TRANSMITTING SCHEDULING REQUEST INFORMATION

CROSS-REFERENCE TO RELATED APPLICATIONS

This application is the National Stage filing under 35 U.S.C. 371 of International Application No. PCT/KR2019/012580, filed on Sep. 27, 2019, which claims the benefit of earlier filing date and right of priority to Korean Application Nos. 10-2018-0115295 filed on Sep. 27, 2018, 10-2019-0017797 filed on Feb. 15, 2019, and 10-2019-0080801 filed on Jul. 4, 2019, the contents of which are all incorporated by reference herein in their entireties.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

As an aspect of the present disclosure, a method of transmitting a scheduling request (SR) by a communication device in a wireless communication system is provided. The method comprises: in a state in which a plurality of physical uplink control channels (PUCCHs) for a plurality of SRs (SR PUCCHs) overlap with a first physical PUCCH including first uplink control information (UCI) in a time domain, mapping SR information associated with the plurality of SRs to specific resource elements (REs) among REs of the first PUCCH, and transmitting the first PUCCH to which the SR information is mapped.

As another aspect of the present disclosure, a communication device for transmitting an SR in a wireless communication system is provided. The communication device comprises at least one transceiver, at least one processor, and at least one computer memory operatively coupled to the at least one processor and storing instructions which when executed, cause the at least one processor to perform operations. The operations comprise: in a state in which a plurality of PUCCHs for a plurality of SRs (SR PUCCHs) overlap with a first physical PUCCH including first UCI in a time domain, mapping SR information associated with the plurality of SRs to specific resource elements (REs) among REs of the first PUCCH, and transmitting the first PUCCH to which the SR information is mapped through the at least one transceiver.

In each aspect of the present disclosure, mapping of the SR information to the specific REs may include puncturing the specific REs among the REs of the first PUCCH and mapping the SR information to the punctured REs.

In each aspect of the present disclosure, mapping of the SR information to the specific REs may include puncturing the specific REs among the REs of the first PUCCH and mapping the SR information to the punctured REs.

In each aspect of the present disclosure, the specific REs may be located in the same symbols as symbols of the plurality of SR PUCCHs among symbols of the first PUCCH.

In each aspect of the present disclosure, each of the plurality of SRs may be mapped to an RE in the same symbol as a symbol of an SR PUCCH for the SR among the specific REs.

In each aspect of the present disclosure, in a state in which the SR PUCCHs include SR PUCCHs overlapping with each other, the specific REs may start in a starting symbol of an SR PUCCH, which is a last of starting symbols of the overlapping SR PUCCHs.

In each aspect of the present disclosure, in a state in which the SR PUCCHs include SR PUCCHs overlapping with each other, the duration of the specific REs may be determined based on the duration of an SR PUCCH, which is a longest of the durations of the overlapping SR PUCCHs.

In each aspect of the present disclosure, the communication device may include an autonomous driving vehicle communicable with at least a user equipment (UE), a network, or another autonomous driving vehicle other than the communication device.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
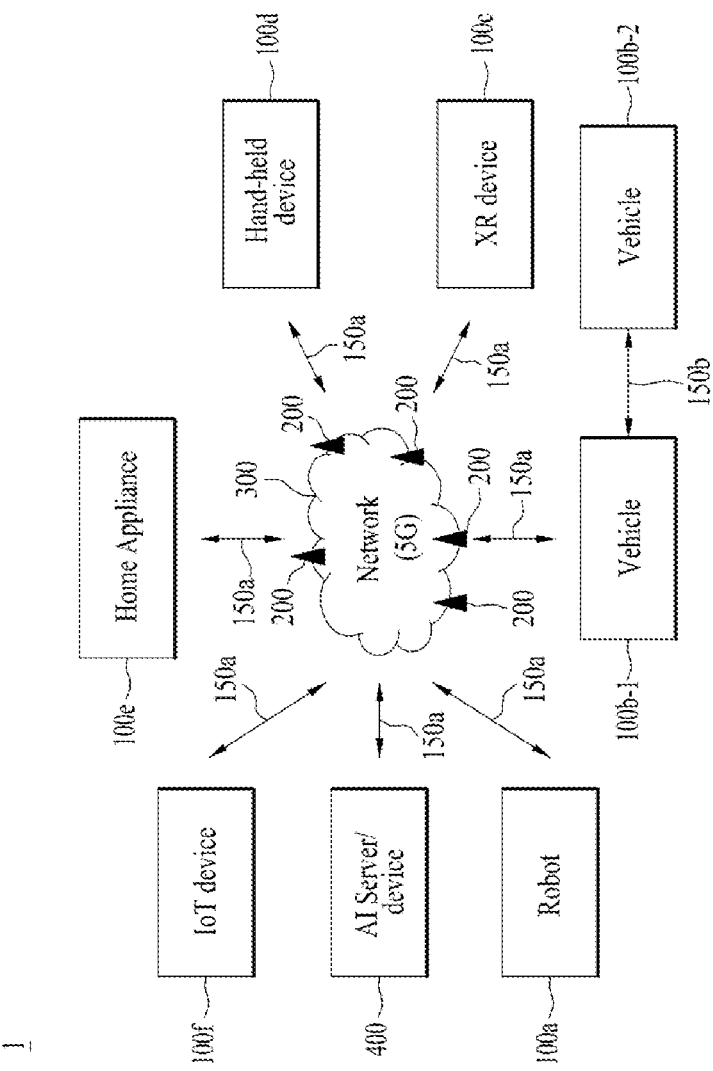
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, puncturing a specific resource in a channel means that although information to be carried on the channel is mapped to the specific resource during resource mapping of the channel, the channel is transmitted without the information part mapped to the punctured resource. Other information may be mapped to the punctured specific resource. In other words, although the punctured specific resource is counted as a resource of the channel during resource mapping of the channel, the information part mapped to the specific resource in the information carried on the corresponding channel is actually not transmitted. A receiver of the channel receives, demodulates, or decodes the channel, assuming that the information part mapped to the punctured specific resource in the information of the channel has not been transmitted, or assuming that information of any other signal or channel has been mapped to the punctured specific resource, instead of the information of the channel. On the other hand, rate-matching a specific resource in a channel means that information to be carried on the channel is not mapped to the specific resource at all during resource mapping of the channel and thus the specific resource is not used to transmit the information carried on the channel. Other information may be mapped to the rate-matched specific resource. In other words, the rate-matched specific resource is not counted as a resource of the channel at all in the resource mapping process of the channel. The receiver of the channel receives, demodulates, or decodes the channel, assuming that the rate-matched specific resource has not been used for mapping and transmission of the information carried on the channel at all, or assuming that information of any other signal or channel has been mapped to the rate-matched specific resource, instead of the information of the channel.

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related uplink control information (UCI) is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry UCI, UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
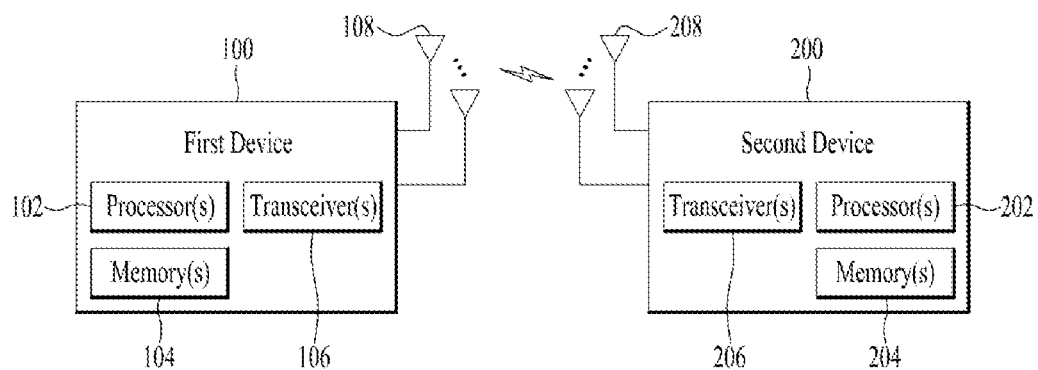
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
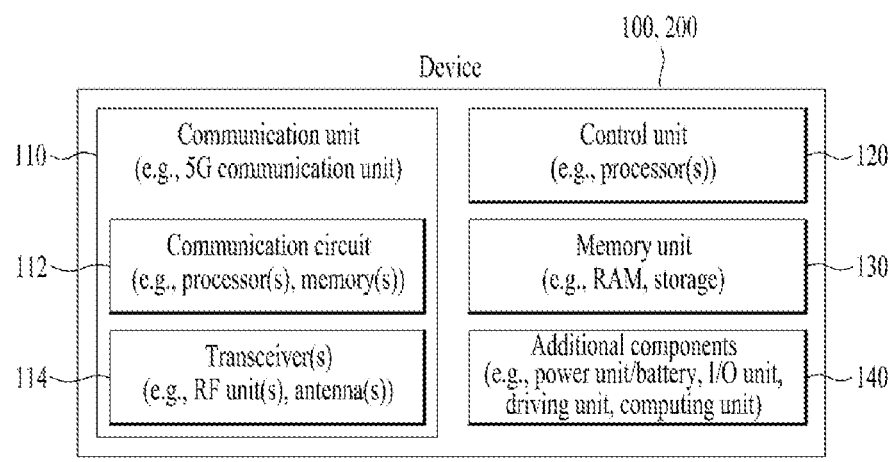
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Figure 4:
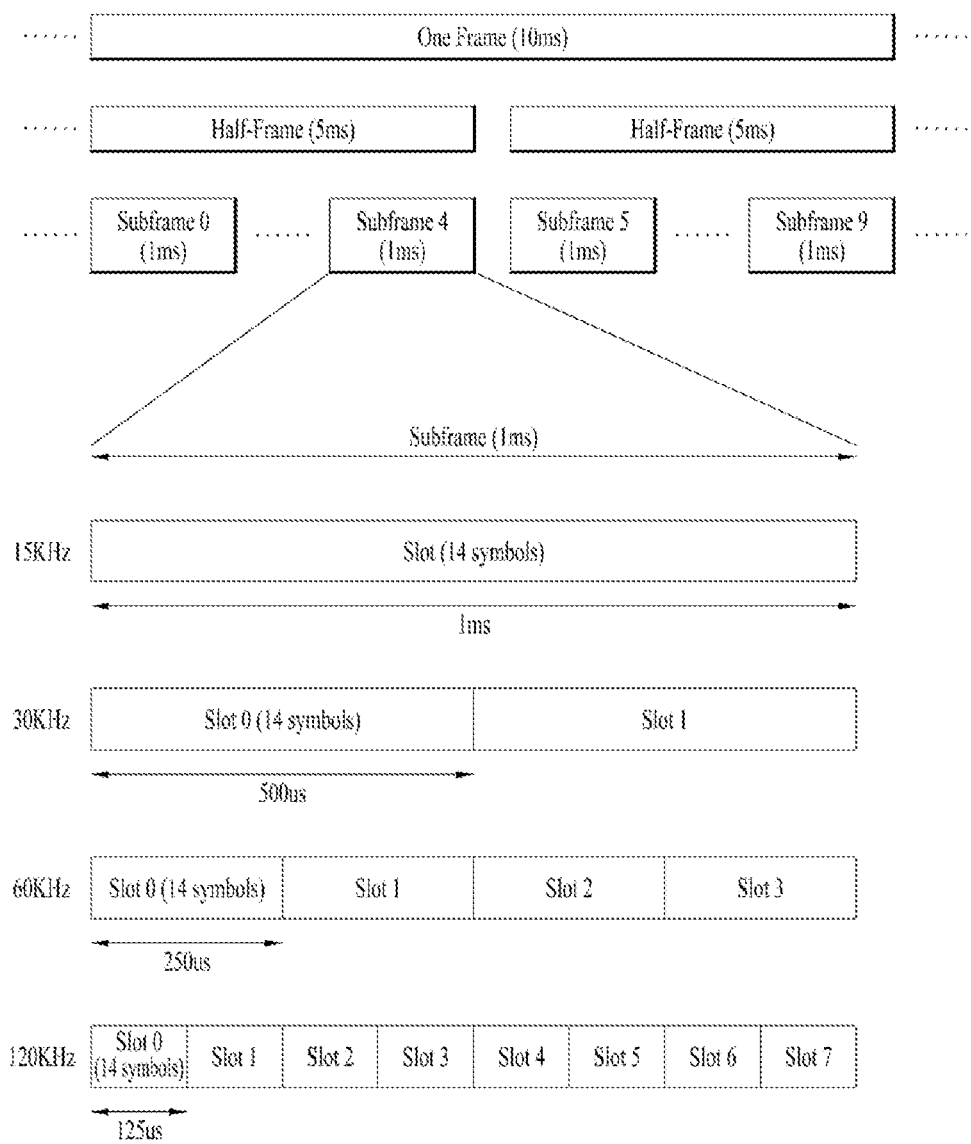
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably Referring to FIG. 4, in the NR system, UL and DL transmissions are organized into frames. Each frame has a duration of $T_f=10$ ms and is divided into two half-frames of 5 ms each. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable sub-carrier spacing $\Delta f=2^u*15$ kHz. The table below shows the number of OFDM symbols ($N^{slot}_{symb}$) per slot, the number of slots ($N^{frame}_{slot}$) per frame, and the number of slots per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

Figure 5:
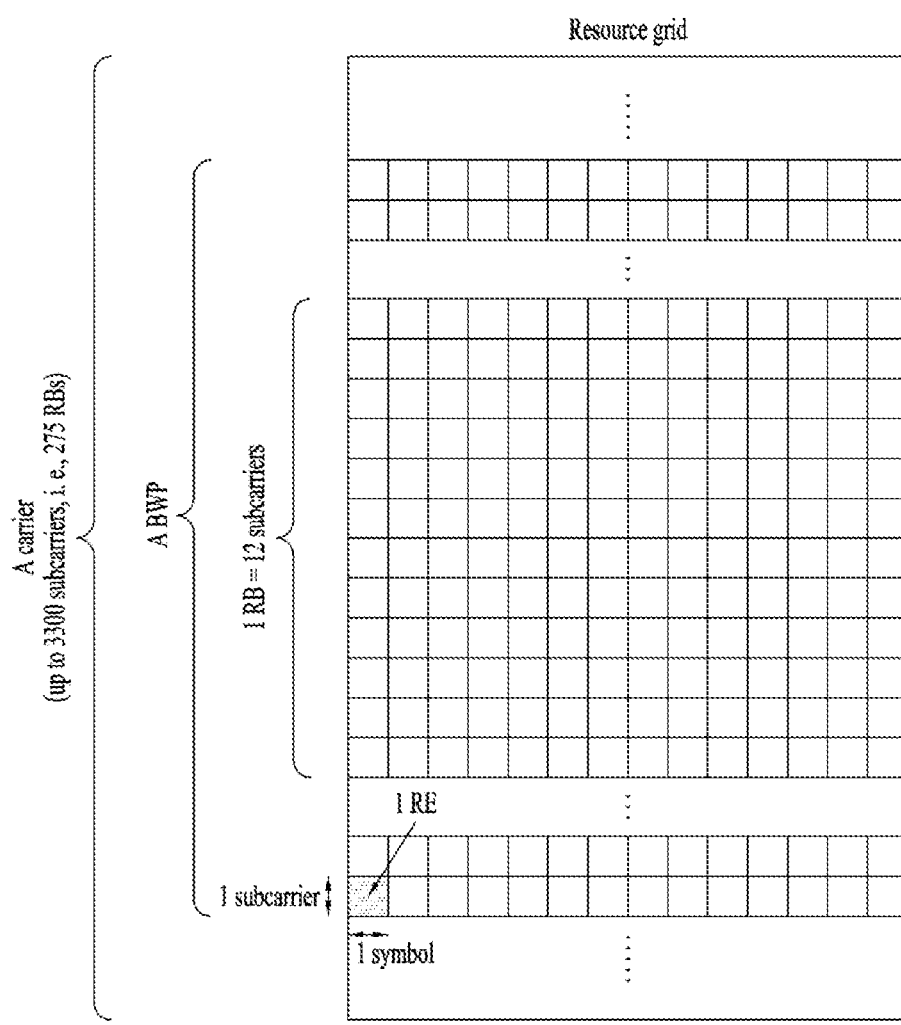
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{PRB}=n_{CRB}+N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Identifies a CORESET related to a search space set.

monitoringSlotPeriodicityAndOffset: Indicates slots for PDCCH monitoring configured as a periodicity and an offset.

monitoringSymbolsWithinSlot: Indicates the first symbol(s) for PDCCH monitoring in the slots for PDCCH monitoring.

nrofCandidates: Indicates the number of PDCCH candidates for each CCE aggregation level.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 3, (0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 3

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.-PUCCH resource set #0, if the number of UCI bits=<2

PUCCH resource set #1, if 2<the number of UCI bits=<$N_1$

. . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 3).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

The PUSCH delivers UL data (e.g., UL-SCH TB) and/or UCI and is transmitted based on a CP-OFDM waveform or a DFT-s-OFDM waveform. When the PUSCH is transmitted based on the DFT-s-OFDM waveform, the UE transmits the PUSCH by applying transform precoding. For example, when transform precoding is impossible (e.g., transform precoding is disabled), the UE transmits the PUSCH based on the CP-OFDM waveform, and when transform precoding is possible (e.g., transform precoding is enabled), the UE transmits the PUSCH based on the CP-OFDM waveform or the DFT-s-OFDM waveform. The PUSCH transmission may be scheduled dynamically by a UL grant in DCI or semi-statically by higher-layer (e.g., RRC) signaling (and/or layer 1 (L1) signaling (e.g., PDCCH)). A resource assignment scheduled semi-statically by higher-layer (e.g., RRC) signaling (and/or L1 (i.e., PHY) signaling) is referred to as a configured grant. The PUSCH transmission may be performed in a codebook-based or non-codebook-based manner.

Figure 6:
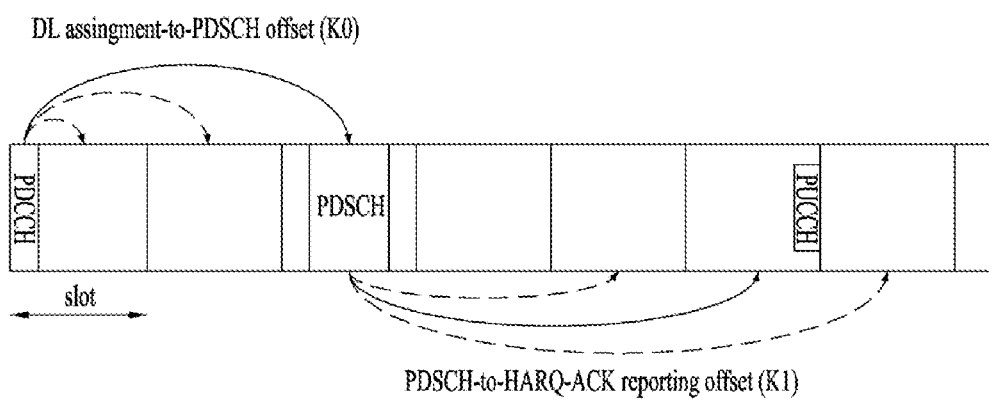
FIG. 6 illustrates a hybrid automatic repeat request-acknowledgement (HARQ-ACK) transmission/reception procedure.

FIG. 6 illustrates a HARQ-ACK transmission/reception procedure.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

Referring to FIG. 6, the UE may detect a PDCCH in slot #n. After the UE receives a PDSCH in slot #(n+K0) according to scheduling information received on the PDCCH, the UE may transmit UCI in slot #(n+K1) on a PUCCH. The UCI includes an HARQ-ACK response for the PDSCH. If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot #(n+K1), UCI transmitted in slot #(n+K1) includes a HARQ-ACK response for the plural PDSCHs.

Figure 7:
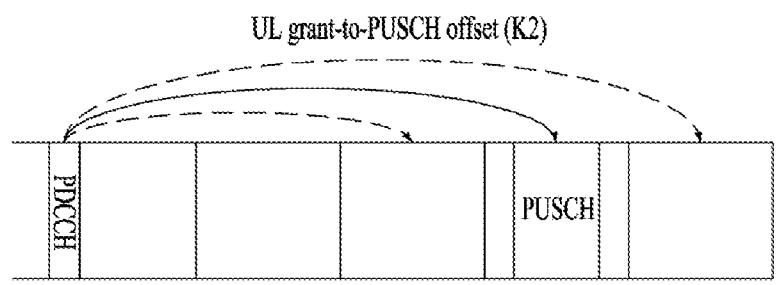
FIG. 7 illustrates an exemplary physical uplink shared channel (PUSCH) transmission/reception procedure.

FIG. 7 illustrates an exemplary PUSCH transmission/reception process. DCI (e.g., DCI format 0_0 and DCI format 0_1) carried on a PDCCH that schedules a PDSCH may include the following information.

Frequency domain resource assignment (FDRA): Indicates an RB set allocated to the PDSCH.

Time domain resource assignment (TDRA): Indicates a UL grant-to-PUSCH slot offset K2, the starting position (e.g., a symbol index S) and length (e.g., the number of symbols, L) of a PUSCH in a slot, and a PUSCH mapping type. The starting symbol S and the length L may be indicated by a start and length indicator (SLIV), or separately. PUSCH mapping type A or PUSCH mapping type B may be indicated by the TDRA. In PUSCH mapping type A, the DMRS is located in the third symbol (symbol #2) or the fourth symbol (symbol #3) of a slot. In PUSCH mapping type B, the DMRS is located in the first symbol allocated to the PUSCH.

Referring to FIG. 7, the UE may detect a PDCCH in slot #n. Then, the UE may transmit a PUSCH in slot #(n+K2) according to scheduling information received on the PDCCH in slot #n. The PUSCH includes a UL-SCH TB.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 8:
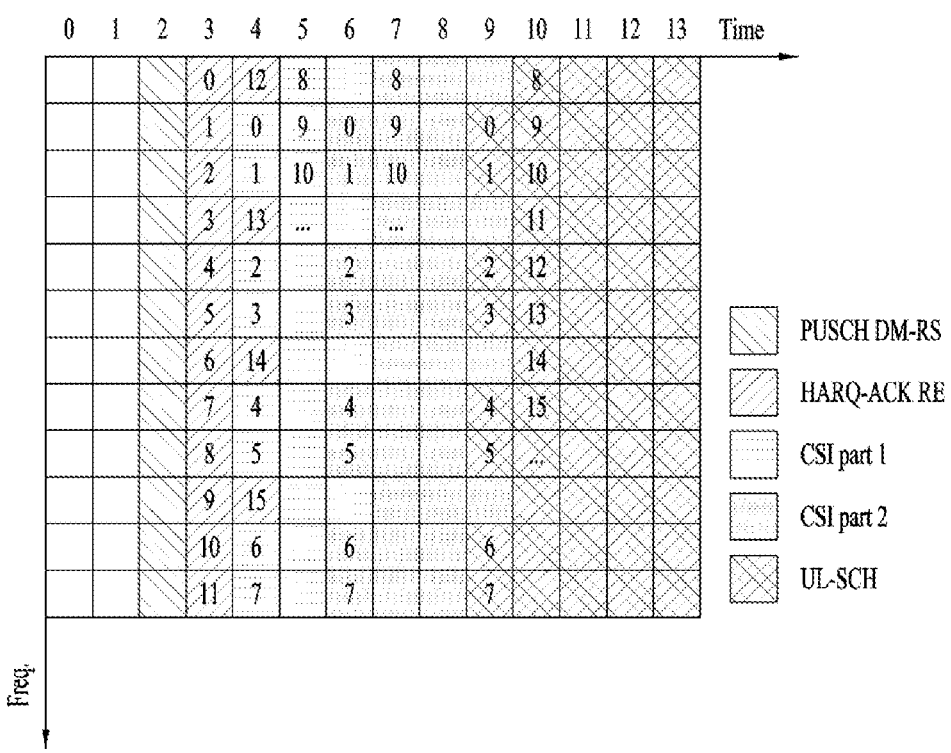
FIG. 8 illustrates an example of multiplexing uplink control information (UCI) with a PUSCH.

FIG. 8 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 8 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 9:
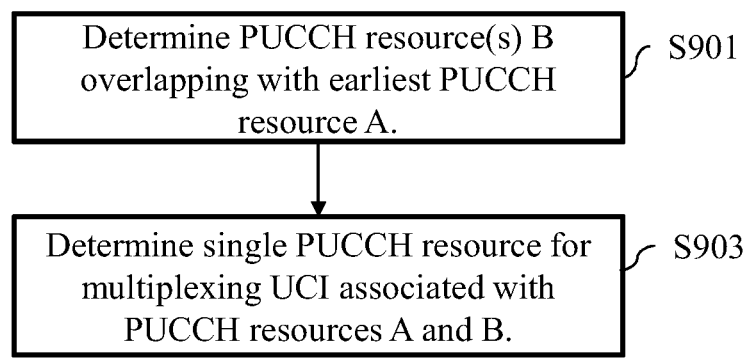
FIG. 9 illustrates an example of a process for a UE with overlapping physical uplink control channels (PUCCHs) in a single slot to handle collision between uplink (UL) channels.

FIG. 9 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S901). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S903). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 10:
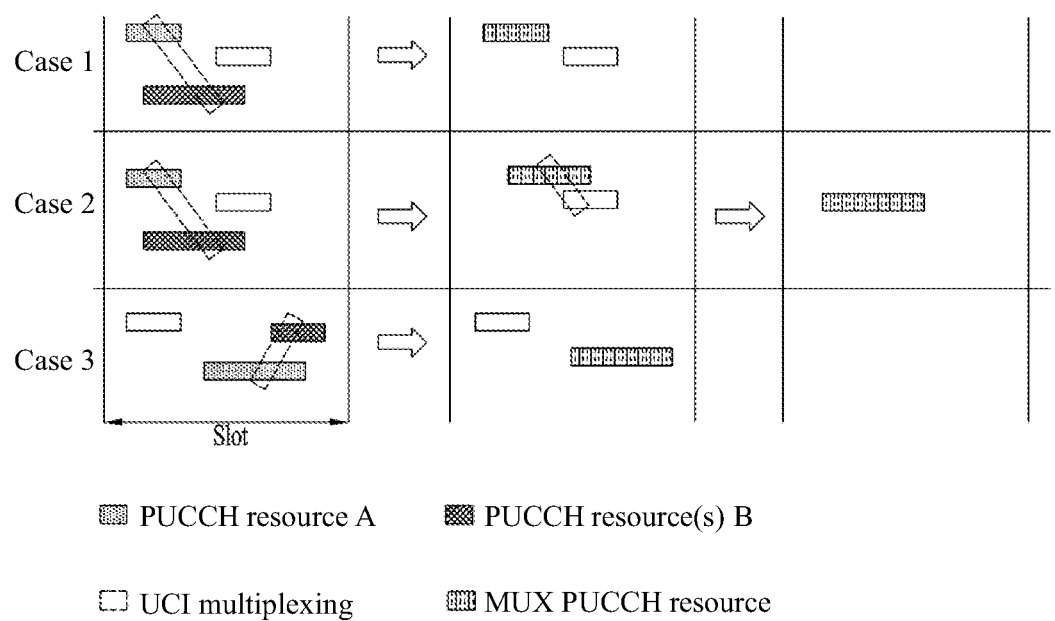
FIG. 10 illustrates cases for performing UCI multiplexing based on FIG. 12.

FIG. 10 illustrates cases for performing UCI multiplexing based on FIG. 9. Referring to FIG. 10, when a plurality of PUCCH resources overlap in a slot, UCI multiplexing may be performed based on the earliest PUCCH resource A (e.g., PUCCH resource A with the earliest start symbol). In FIG. 10, Case 1 and Case 2 show that the first PUCCH resource overlaps with another PUCCH resource. In this case, the process of FIG. 9 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 9 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 9 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 11:
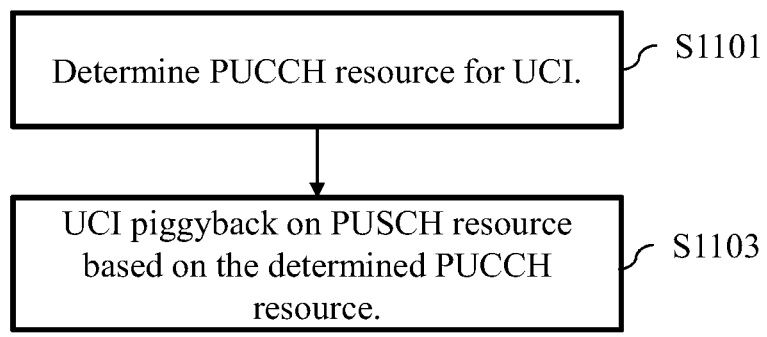
FIG. 11 illustrates a process for a user equipment (UE) with an overlapping PUCCH and PUSCH in a single slot to handle collision between UL channels.

FIG. 11 illustrates a process for a UE with an overlapping PUCCH and PUSCH in a single slot to handle collision between UL channels.

To transmit UCI, the UE may determine a PUCCH resource (S1101). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1103). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 12:
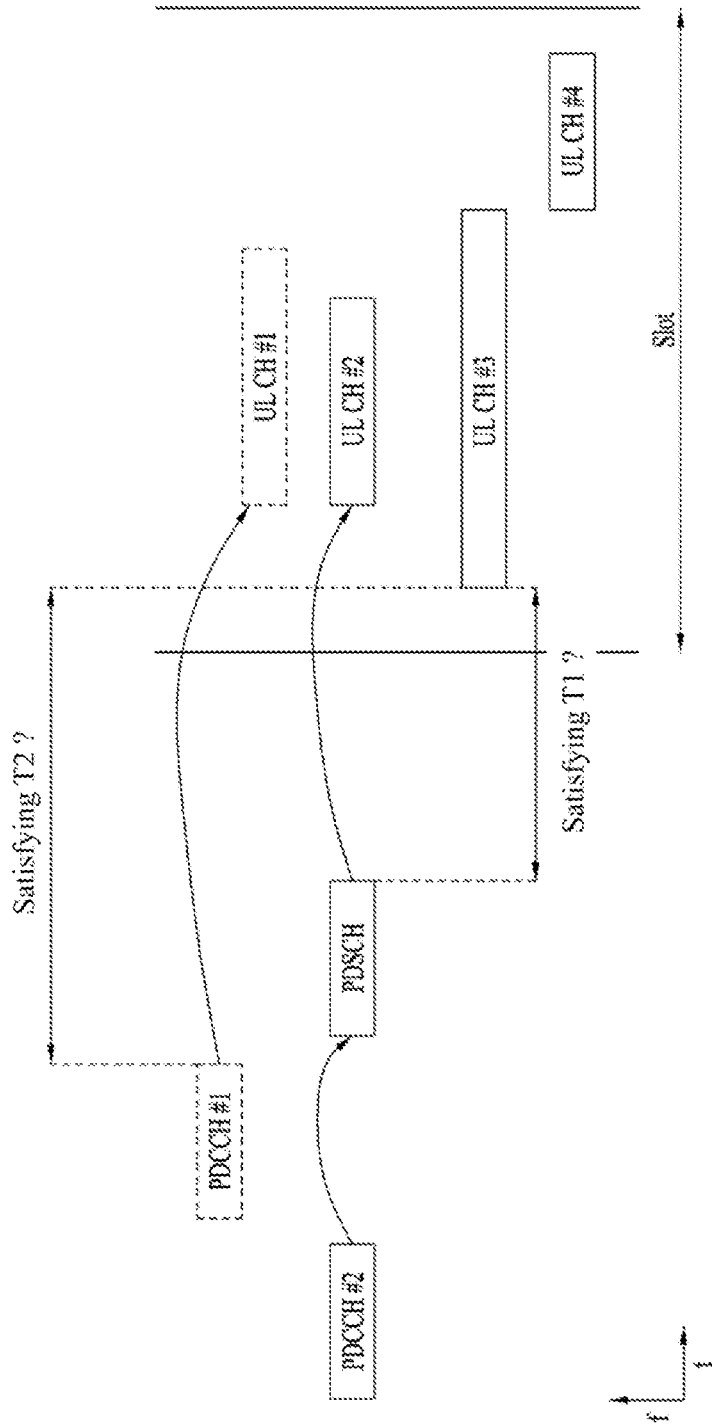
FIG. 12 illustrates UCI multiplexing considering a timeline condition.

FIG. 12 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) d1 predefined as an integer equal to or greater than 0 according to a scheduled symbol position, a DMRS position in the PUSCH, BWP switching, etc.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc.

Tables below show processing times according to UE processing capability. Particularly, Table 4 shows a PDSCH processing time for PDSCH processing capability #1 of the UE, Table 5 shows a PDSCH processing time for PDSCH processing capability #2 of the UE, Table 6 shows a PUSCH preparation time for PDSCH processing capability #1 of the UE, and Table 7 shows a PUSCH processing time for PDSCH processing capability #2 of the UE.

TABLE 4

| | PDSCH decoding time N1 [symbols] | |
|---|---|---|
| u/SCS | Front-loaded DMRS only | Front-loaded + additional DMRS |
| 0/15 kHz | 8 | 13 |
| 1/30 kHz | 10 | 13 |
| 2/60 kHz | 17 | 20 |
| 3/120 kHz | 20 | 24 |

TABLE 5

| | PDSCH decoding time N1 [symbols] | |
|---|---|---|
| u/SCS | Front-loaded DMRS only | Front-loaded + additional DMRS |
| 0/15 kHz | 3 | [13] |
| 1/30 kHz | 4.5 | [13] |
| 2/60 kHz | 9 for frequency range 1 | [20] |

TABLE 6

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 7

| u/SCS | PUSCH preparation time N2 [symbols] |
|---|---|
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 9 to 11 may be UL channels that satisfy the multiplexing timeline condition(s). Referring to FIG. 12, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

A scheduling request (SR) is used for the UE to request UL-SCH resources for a (new) transmission. A MAC entity in the MAC layer above the PHY layer may be configured with zero, one, or more SR configurations. An SR configuration includes a set of PUCCH resources for an SR across different BWPs. To accommodate different types of data transfer services, a plurality of types of logical channels are defined, each supporting a specific type of information. The MAC entity supports mapping between logical channels and transport channels (e.g., UL-SCH and DL SCH). For a logical channel, at most one PUCCH resource for an SR is configured per BWP. For a logical channel, for example, an SR configuration applicable to the logical channel may be indicated to the UE by the ID of the SR configuration. Each SR configuration corresponds to one or more logical channels. Each logical channel may be mapped to zero or more SR configurations, which are configured by RRC signaling from the network. If an SR is triggered, the MAC entity has an SR transmission occasion on a valid PUCCH resource configured for the SR, an SR prohibit timer is not running at the time of the SR transmission occasion, and the PUCCH resource for the SR transmission occasion does not overlap with a measurement gap or with a UL-SCH resource (e.g., a PUSCH resource), the MAC entity instructs the PHY layer below the MAC layer to signal the SR on one valid PUCCH resource for the SR. If, for a logical channel belonging to a logical channel group including the one or more logical channels, UL data is available to the MAC entity and if there is no UL resource available for a new transmission, the SR may be triggered.

The UE is configured, by a higher-layer (e.g., RRC) parameter SchedulingRequestResourceConfig provided by the network, with a set of configurations for an SR in a PUCCH transmission using either PUCCH format 0 or PUCCH format 1. The higher-layer (e.g., RRC) parameter SchedulingRequestResourceConfig may include a parameter SchedulingRequestResourceId identifying an SR resource on a PUCCH, a parameter SchedulingRequestId indicating the ID of an SR configuration using the SR resource, and a parameter periodicityAndOffse indicating an SR periodicity and an SR offset. The parameter SchedulingRequestResourceConfig may include the ID of a PUCCH resource on which the UE will transmit the SR. The UE is configured with the PUCCH resource by the higher-layer parameter SchedulingRequestResourceId providing a PUCCH format 0 resource or a PUCCH format 1 resource. The UE is also configured with a periodicity $SR_{PERIODICITY}$ in symbols or slots and an offset $SR_{OFFSET}$ in slots by the higher-layer parameter periodicityAndOffset of the network for a PUCCH transmission conveying the SR. If $SR_{PERIODICITY}$ is larger than one slot, the UE may determine the SR transmission occasion in the PUCCH to be in a slot with number $N^u_{s,f}$ in a frame with number of if $(n_f * N^{frame,u}_{slot} + n^u_{s,f} - SR_{OFFSET}) \mod SR_{PERIODICITY} = 0$. If $SR_{PERIODICITY}$ is one slot, the UE expects that $SR_{OFFSET} = 0$ and every slot is an SR transmission occasion in the PUCCH. If $SR_{PERIODICITY}$ is smaller than one slot, the UE determines the SR transmission occasion in the PUCCH to start in a symbol with index l if $(l-l_0 \mod SR_{PERIODICITY}) \mod SR_{PERIODICITY} = 0$ where $l_0$ is the index of the starting symbol of the corresponding PUCCH format. According to the current NR standard (e.g., 38.213 V15.2.0), the UE transmits a PUCCH in a PUCCH resource for a corresponding SR configuration only when the UE transmits a positive SR. Further, according to the current NR standard (e.g., 38.213 V15.2.0), the UE is configured to transmit K PUCCHs for respective K SRs in a slot, as determined by a set of SchedulingRequestResourceId, with SR transmission occasions that would overlap with a PUCCH transmission with HARQ-ACK information from the UE in the slot or with a PUCCH transmission with CSI report(s) from the UE in the slot.

For example, if the UE would transmit a PUCCH with $O_{ACK}$ HARQ-ACK information bits in a resource using PUCCH format 2 or PUCCH format 3 or PUCCH format 4 in a slot, $\text{ceil}\{\log_2(K+1)\}$ bits representing a negative or positive SR are appended to the HARQ-ACK information bits in ascending order of the values of SchedulingRequestResourceId, and the UE transmits the combined UCI bits on a PUCCH using a resource with PUCCH format 2 or PUCCH format 3 or PUCCH format 4 for transmission of HARQ-ACK information bits. An all-zero value for the $\text{ceil}\{\log_2(K+1)\}$ bits represents a negative SR value across all K SRs.

In another example, if the UE would transmit periodic/semi-persistent CSI in a resource using PUCCH format 2 or PUCCH format 3 or PUCCH format 4 in a slot, $\text{ceil}\{\log_2(K+1)\}$ bits representing the corresponding negative or positive SR are prepended to the periodic/semi-persistent CSI bits in ascending order of the values of SchedulingRequestResourceId, and the UE transmits a PUCCH with the combined UCI bits in a resource with PUCCH format 2 or PUCCH format 3 or PUCCH format 3 for CSI reporting.

Figure 13:
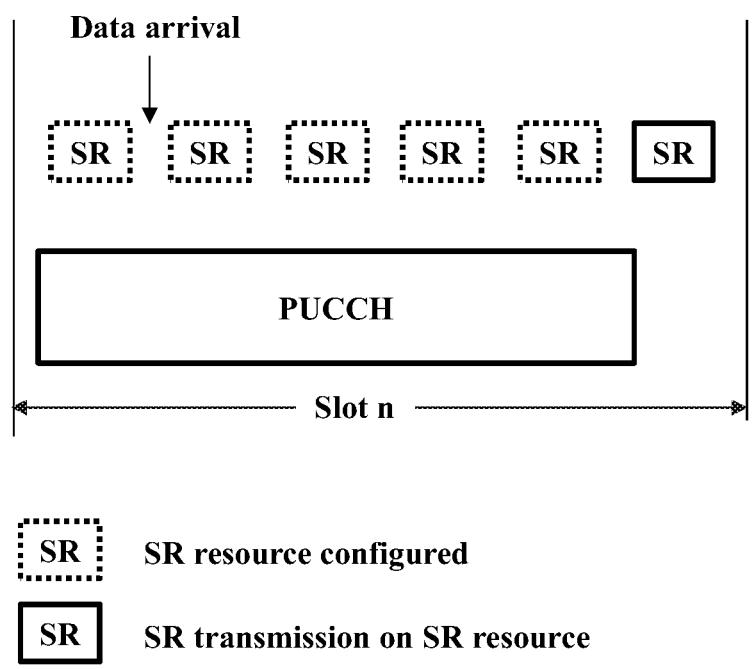
FIG. 13 illustrates exemplary collision between one PUCCH resource and a plurality of scheduling request (SR) PUCCHs.

FIG. 13 illustrates exemplary collision between one PUCCH resource and a plurality of SR PUCCHs. In particular, FIG. 13 illustrates an exemplary case in which an SR transmission is delayed due to collision with another PUCCH.

There may be a plurality of SR transmission opportunities (i.e., transmission occasions) in a slot due to the short periodicity of an SR configuration, or there may be a plurality of SR transmission occasions corresponding to a plurality of SR configurations, respectively in one slot. In this case, according to the current NR standard (e.g., 3GPP TS 38.213 V15.2.0), when a plurality of SR transmission occasions overlap with another PUCCH resource (e.g., HARQ-ACK feedback or CSI reporting) on the time axis or on the time and frequency axes, the UE combines $\text{ceil}\{\log_2(K+1)\}$ bits representing a plurality of (e.g., K) SRs corresponding to the plurality of SR transmission occasions with UCI of the other PUCCH resource and transmits the combined UCI bits in the one PUCCH resource. Referring to FIG. 13, when UL data arrives at the MAC entity of the UE at a specific time in a slot carrying a PUCCH containing the combined UCI (hereinafter, referred to as a long PUCCH) and a positive SR is triggered by the UL data, SR information multiplexed in the long PUCCH would be negative SR information, and the UE may transmit the positive SR only after the transmission of the long PUCCH ends (in spite of the presence of an SR transmission occasion in the slot). It is not preferable that the SR transmission is delayed when an SR for data traffic with a strict delay requirement is to be transmitted. Moreover, even though the positive SR is generated before UCI is multiplexed in the long PUCCH and thus the positive SR may be multiplexed in the long PUCCH, a BS receiving the long PUCCH should complete decoding of the long PUCCH to obtain the SR information multiplexed in the long PUCCH. Therefore, it may not be preferred to combine the SR for the data traffic having a strict delay requirement with other UCI and transmit the combined UCI on the long PUCCH. Accordingly, there is a need for a scheme that allows the UE to transmit an SR without delay (or with only a short delay) while minimizing loss of UCI of a long PUCCH. While the present disclosure is described in the context of an SR being included in a long PUCCH, by way of example, examples of the present disclosure may also be applied even when the SR is included in a PUSCH.

In the present disclosure, a plurality of SR resources overlapping with another PUCCH (or a PUSCH) in time or in time and frequency may correspond to one or more SR configurations, respectively. Alternatively, the plurality of SR resources may correspond to a plurality of SR configurations, including two or more SR resources corresponding to the same SR configuration.

Figure 14:
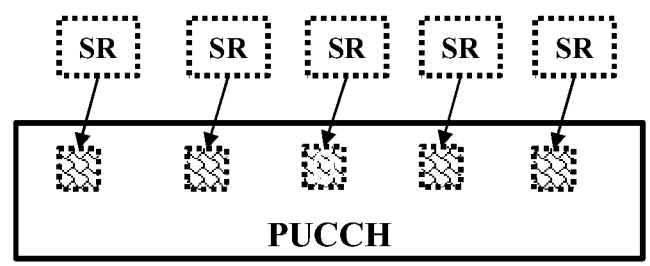
FIG. 14 illustrates an exemplary SR transmission method according to an implementation of the present disclosure.

FIG. 14 illustrates an exemplary SR transmission method according to an implementation of the present disclosure.

When SR transmission(s) overlaps with a PUCCH resource (hereinafter, referred to as a long PUCCH) on the time axis, a method of transmitting SR(s) in the long PUCCH may be considered in order to minimize/eliminate the delay of the SR transmission(s) while minimizing loss of UCI in the long PUCCH. For example, a method of puncturing or rate-matching some of the resource elements (REs) of the long PUCCH and mapping SR information to the punctured or rate-matched RE(s) may be considered. In this method, the UE may transmit SR information in REs at predetermined positions in the overlapping long PUCCH (with SR PUCCHs on the time axis), and the BS may determine whether the UE has transmitted an SR by checking only the REs at the corresponding positions without completely decoding the long PUCCH.

Referring to FIG. 14, for example, when there are x SR resources overlapping with a long PUCCH resource, it may be regulated that the UE punctures or rate-matches y (e.g., y=x) REs in the long PUCCH. In particular, it may be regulated that an RE at the same position as a symbol including each SR transmission occasion among the REs of the long PUCCH includes information of a corresponding SR. Additionally, the UE according to the present disclosure may operate based on the following rule(s).

When an RE to which SR information is mapped (hereinafter, referred to as an SR RE) among the REs of the long PUCCH overlaps with a symbol carrying a DMRS (hereinafter, referred to as a DMRS symbol) of the long PUCCH, it may be regulated that an RE of the symbol immediately following the DMRS symbol may be punctured or rate-matched for transmission of the SR information.

Alternatively, when an SR RE overlaps with a symbol including an RE with an HARQ-ACK (and/or "HARQ+CSI" and/or "HARQ-ACK+CSI part 1") (hereinafter, referred to as an HARQ-ACK RE) among the REs of the long PUCCH, and when an RE carrying information other than the HARQ-ACK (and/or "HARQ+CSI" and/or "HARQ-ACK+CSI part 1") RE is located in the same symbol, it may be regulated that the UE punctures or rate-matches the RE carrying the other information, not the HARQ-ACK (and/or "HARQ+CSI" and/or "HARQ-ACK+CSI part 1") RE. Alternatively, for a symbol to which the UE will map SR information among the symbols of the long PUCCH, it may be regulated that the UE first maps the SR by rate-matching and then maps the HARQ-ACK (and/or "HARQ+CSI" and/or "HARQ-ACK+CSI part 1").

When a plurality of SR resources having different IDs (e.g., SchedulingRequestResourceId) overlap with a long PUCCH resource in time/frequency (e.g., in time or in time and frequency), REs of the long PUCCH may be punctured or rate-matched, starting from the starting symbol of an SR resource, which is the last of the starting symbols of the plurality of SR resources (or an SR resource with an ID corresponding to a lowest index, or an SR resource with a longest duration, or an SR resource with a shortest duration), and SR information may be mapped to the punctured or rate-matched REs. For example, in consideration of a processing time for a case in which the last of SR resources overlapping with the PUCCH (on the time axis) is for transmission of a positive SR, PUCCH RE(s) (overlapping with the SR resources on the time axis) may be punctured or rate-matched for SR transmission, starting from the starting symbol of an SR resource, which is the last of the starting symbols of the SR resources. Further, when a plurality of SR resources having different IDs (e.g., SchedulingRequestResourceId) overlap with another PUCCH resource in time/frequency (e.g., in time or in time and frequency), the duration of a resource to which SR information is mapped by puncturing/rate-matching in the PUCCH resource may be based on the length of an SR resource with a longest duration (or an SR resource with the last starting symbol, an SR resource with an ID corresponding to a lowest index, or an SR resource with a shortest duration) to guarantee the coverage of the SR resources. Alternatively, a duration subjected to puncturing/rate-matching in the other PUCCH resource may be determined based on a value preconfigured for the UE by a higher-layer signal.

It may be regulated that a different operation of transmitting SR information is determined according to the type of UCI carried on a long PUCCH. For example, when the UCI carried on the long PUCCH is an HARQ-ACK, the UE operation may be determined to be rate-matching some RE(s) of the long PUCCH (to map SR information), whereas when the UCI carried on the long PUCCH is CSI, the UE operation may be determined to be puncturing some RE(s) of the long PUCCH (to map SR information). When the UCI of the long PUCCH is HARQ-ACK information, rate-matching some RE(s) of the long PUCCH for an SR transmission overlapping with the long PUCCH (on the time/frequency) may advantageously protect the HARQ-ACK on the PUCCH as much as possible, compared to puncturing the RE(s) of the long PUCCH.

When the UE performs the puncturing/rate-matching operation, the UE may determine a frequency resource to be punctured/rate-matched in the following methods.

(a) Option a: When K SR resources having different IDs (e.g., schedulingRequestResourceId) (refer to the IE SchedulingRequestResourceConfig in 3GPP TS 38.331) overlap with another PUCCH resource (hereinafter, referred to as a long PUCCH resource) in time/frequency (e.g., in time or in time and frequency) (when K=1, only one SR resource exists), it may be regulated that punctured/rate-matched REs among the REs of the long PUCCH resource are located at different frequency positions. In particular, the starting points of the punctured/rate-matched REs (and/or RBs) may be derived from the IDs of the SR resources. For example, mapping of an SR with ID 0 may start in an $x^{th}$ RE (and/or RB) of the long PUCCH, and mapping of an SR with ID 1 may start in a $y^{th}$ RE (and/or RB) of the long PUCCH.

(b) Option b: In another example, once an RE (and/or RB) to be punctured/rate-matched for a specific SR resource (e.g., with an ID corresponding to a lowest index) is determined among the REs of the long PUCCH, REs (and/or RBs) to be punctured/rate-matched may be determined for SR resources with the remaining IDs based on the determined RE (and/or RB). For example, when the UE punctures/rate-matches REs x to x+m for the SR resource with the ID corresponding to the lowest index among the REs of the long PUCCH, the UE may puncture/rate-match REs for an SR resource with an ID corresponding to the next lowest index, starting from RE x+m+1 (or RE x+m+n) and puncture/rate-match some of the long PUCCH REs, for SR resource(s) with the remaining ID(s) (e.g., in ascending order of IDs) to map SR information to the PUCCH resource. For example, an SR in SR resource #1 may be mapped to REs x to x+m (by puncturing or rate-matching), and an SR in SR resource #2 may be mapped to REs x+m+1 to x+2m (by puncturing or rate-matching).

Because individual resources of a long PUCCH resource are assigned to a plurality of SR resources overlapping with the long PUCCH resource (on the time axis or on the time and frequency axes) in Option a and Option b, the UE may transmit only positive SRs in SR REs for the positive SRs, without using SR RE(s) for negative SR(s). Accordingly, SR information of the plurality of SR resources may be transmitted using only a relatively small number of REs in the long PUCCH resource.

When performing the puncturing/rate-matching operation, the UE may determine the number of REs to be punctured/rate-matched in the following methods.

(a) Option c: When K SR resources having different IDs (e.g., schedulingRequestResourceId) overlap with another PUCCH resource (hereinafter, referred to as a long PUCCH resource) in time/frequency (e.g., in time or in time and frequency) (when K=1, only one SR resource exists), it may be regulated that the number of REs is derived based on SR payload, assuming that ceil{max(1, $\log_2(K)$)} bit(s) is the SR payload. For example, the UE may determine the number of REs by the following equation: number of REs={ceil{max(1, $\log_2(K)$)}}*(number of layers)/(modulation order).

(b) Option d: When K SR resources having different IDs (e.g., schedulingRequestResourceId) overlap with another PUCCH resource (hereinafter, referred to as a long PUCCH resource) in time/frequency (e.g., in time or in time and frequency) (when K=1, only one SR resource exists), it may be regulated that when one or more of K SRs for the K SR resources are positive SRs, the number of REs is derived based on SR payload on the assumption that one bit (or n bits <K bits) is the SR payload (e.g., bundled SRs). For example, when one or more of four SRs (K=4) are positive SRs, a value (e.g., 1) obtained by bundling the four SRs may be assumed to be SR payload, and when the four SRs are all zeroes, a value (e.g., 0) obtained by bundling the four SRs may be assumed to be SR payload.

Because only one resource of a long PUCCH resource overlapping with a plurality of SR resources (on the time axis or on the time and frequency axes) is assigned to the plurality of SR resources in Option c and Option d, Option c and Option d may relatively reduce the number of blind decodings at the BS.

Now, a description will be given of a BS operation, when x SR transmissions overlap with a long PUCCH. Referring to FIG. 14, for example, when there are x SR resources overlapping with a long PUCCH resource, the BS may receive and decode a long PUCCH in consideration of REs punctured/rate-matched for the SR resources, expecting that y (e.g., y=x) REs are punctured or rate-matched in the long PUCCH. In particular, the BS may receive and decode the long PUCCH, expecting that corresponding SR information is included in RE(s) located in the same symbol as each SR transmission occasion among the REs of the long PUCCH.

When an RE to which SR information is mapped (hereinafter, referred to as an SR RE) among the REs of the long PUCCH overlaps with a symbol carrying a DMRS (hereinafter, referred to as a DMRS symbol) of the long PUCCH, the BS may receive and decode the long PUCCH, expecting that an RE of the symbol immediately following the DMRS symbol is punctured or rate-matched for transmission of the SR information.

Alternatively, when an SR RE overlaps with a symbol including an RE with an HARQ-ACK (and/or "HARQ+CSI" and/or "HARQ-ACK+CSI part 1") (hereinafter, referred to as an HARQ-ACK RE) among the REs of the long PUCCH, and when an RE carrying information other than the HARQ-ACK (and/or "HARQ+CSI" and/or "HARQ-ACK+CSI part 1") RE is located in the same symbol, the BS may receive and decode the long PUCCH, expecting that the RE carrying other information is punctured or rate-matched, not the HARQ-ACK (and/or "HARQ+CSI" and/or "HARQ-ACK+CSI part 1") RE. Alternatively, for a symbol to which the UE will map the SR information among the symbols of the long PUCCH, the BS may receive and decode the long PUCCH, expecting that the UE first maps the SR by rate-matching and then maps the HARQ-ACK (and/or "HARQ+CSI" and/or "HARQ-ACK+CSI part 1").

When a plurality of SR resources having different IDs (e.g., schedulingRequestResourceId) overlap with a long PUCCH resource in time/frequency (e.g., in time or in time and frequency), the BS may receive a UL channel (e.g., PUCCH) to which SR information is mapped, expecting that REs of the long PUCCH are punctured or rate-matched, starting from the starting symbol of an SR resource, which is the last of the starting symbols of the plurality of SR resources (or an SR resource with an ID corresponding to a lowest index, or an SR resource with a longest duration, or an SR resource with a shortest duration) and the SR information is mapped to the punctured or rate-matched REs. For example, in consideration of a processing time for a case in which the last of SR resources overlapping with the PUCCH (on the time axis) is for transmission of a positive SR, the UE may puncture or rate-match PUCCH RE(s) (overlapping with the SR resources on the time axis) for SR transmission, starting from the starting symbol of an SR resource, which is the last of the starting symbols of the SR resources. Further, when a plurality of SR resources having different IDs (e.g., schedulingRequestResourceId) overlap with another PUCCH resource in time/frequency (e.g., in time or in time and frequency), the BS may expect that the duration of a resource to which SR information is mapped in the other PUCCH resource by puncturing/rate-matching may be based on the length of an SR resource with a longest duration (or an SR resource with the last starting symbol, an SR resource with an ID corresponding to a lowest index, or an SR resource with a shortest duration) for ensuring the coverage of the SR resources, and receive a UL channel (e.g., PUCCH) to which the SR information is mapped. Alternatively, the BS may preconfigure, for the UE, a time duration subjected to puncturing/rate-matching in the other PUCCH resources based on a value by a higher-layer signal, and receive the UL channel (e.g., PUCCH) to which the SR information is mapped according to the configured value.

The BS may receive and decode the long PUCCH, expecting that a different operation of transmitting SR information is determined according to the type of UCI carried on the long PUCCH. For example, when the UCI carried on the long PUCCH is an HARQ-ACK, the UE operation may be determined to be rate-matching some RE(s) of the long PUCCH (to map SR information), whereas when the UCI carried on the long PUCCH is CSI, the UE operation may be determined to be puncturing some RE(s) of the long PUCCH (to map SR information). The BS may receive and decode the long PUCCH based on the determined UE operation. When the UCI of the long PUCCH is HARQ-ACK information, rate-matching some RE(s) of the long PUCCH for an SR transmission overlapping with the long PUCCH (on the time/frequency axis) may advantageously protect the HARQ-ACK on the PUCCH as much as possible, compared to puncturing the RE(s) of the long PUCCH.

The BS may receive a UL channel, assuming/expecting that when the UE performs the puncturing/rate-matching operation, the UE determines frequency resources to be punctured/rate-matched in the following methods.

(a) Option a: When K SR resources having different IDs (e.g., schedulingRequestResourceId) (refer to the IE SchedulingRequestResourceConfig in 3GPP TS 38.331) overlap with another PUCCH resource (hereinafter, referred to as a long PUCCH resource) in time/frequency (e.g., in time or in time and frequency) (when K=1, only one SR resource exists), it may be regulated that punctured/rate-matched REs among the REs of the long PUCCH resource are located at different frequency positions. In particular, the starting points of the punctured/rate-matched REs (and/or RBs) may be derived from the IDs of the SR resources. For example, mapping of an SR with ID 0 may start in an $x^{th}$ RE (and/or RB) of the long PUCCH, and mapping of an SR with ID 1 may start in a $y^{th}$ RE (and/or RB) of the long PUCCH.

(b) Option b: In another example, once an RE (and/or RB) to be punctured/rate-matched for a specific SR resource (e.g., with an ID corresponding to a lowest index) is determined among the REs of the long PUCCH, REs (and/or RBs) to be punctured/rate-matched may be determined for SR resources with the remaining IDs based on the determined RE (and/or RB). For example, when REs x to x+m are punctured/rate-matched for the SR resource with the ID corresponding to the lowest index among the REs of the long PUCCH, REs may be punctured/rate-matched for an SR resource with an ID corresponding to the next lowest index, starting from RE x+m+1 (or RE x+m+n), and some of the long PUCCH REs may be punctured/rate-matched for SR resource(s) with the remaining ID(s) (e.g., in ascending order of IDs), to map SR information to the punctured/rate-matched REs of the PUCCH resource. For example, an SR in SR resource #1 may be mapped to REs x to x+m (by puncturing or rate-matching), and an SR in SR resource #2 may be mapped to REs x+m+1 to x+2m (by puncturing or rate-matching).

Because individual resources of a long PUCCH resource are assigned to a plurality of SR resources overlapping with the long PUCCH resource (on the time axis or on the time and frequency axes) in Option a and Option b, only SR REs for positive SRs may be used for transmission of the positive SRs, without using SR RE(s) for negative SR(s). Accordingly, SR information of the plurality of SR resources may be transmitted using only a relatively small number of REs in the long PUCCH resource.

The BS may receive a UL channel, assuming/expecting that when the UE performs the puncturing/rate-matching operation, the UE determines REs to be punctured/rate-matched in the following methods.

(a) Option c: When K SR resources having different IDs (e.g., schedulingRequestResourceId) overlap with another PUCCH resource (hereinafter, referred to as a long PUCCH resource) in time/frequency (e.g., in time or in time and frequency) (when K=1, only one SR resource exists), it may be regulated that the number of REs is derived based on SR payload, assuming that ceil{max(1, log 2(K))} bit(s) is the SR payload. For example, the number of REs may be determined by the following equation: number of REs={ceil{max(1, log 2(K))}}*(number of layers)/(modulation order).

(b) Option d: When K SR resources having different IDs (e.g., schedulingRequestResourceId) overlap with another PUCCH resource (hereinafter, referred to as a long PUCCH resource) in time/frequency (e.g., in time or in time and frequency) (when K=1, only one SR resource exists), it may be regulated that when one or more of K SRs for the K SR resources are positive SRs, the number of REs is derived based on SR payload on the assumption that one bit (or n bits <K bits) is the SR payload (e.g., bundled SRs). For example, when one or more of four SRs (K=4) are positive SRs, a value (e.g., 1) obtained by bundling the four SRs may be assumed to be SR payload, and when the four SRs are all zeroes, a value (e.g., 0) obtained by bundling the four SRs may be assumed to be SR payload.

Because only one resource of a long PUCCH resource overlapping with a plurality of SR resources (on the time axis or on the time and frequency axes) is assigned to the plurality of SR resources in Option c and Option d, Option c and Option d may relatively reduce the number of blind decodings at the BS.

As noted from the example of FIG. 13, when SR information based on an SR for each of SR resources is combined with UCI, the combined UCI is mapped to REs of a PUCCH after channel coding and modulation. Therefore, the BS may obtain the combined UCI only after receiving the whole PUCCH and completing decoding of the PUCCH, and then obtain the SR information from the obtained combined UCI. Compared to this method, SR information associated with SR resources is inserted into a PUCCH other than SR PUCCHs by puncturing/rate-matching REs of the other PUCCH, instead of being combined with UCI of the other PUCCH according to the afore-described example of the present disclosure. The UCI of the other PUCCH is channel-encoded and modulated according to a channel coding and modulation rule and mapped to the REs of the other PUCCH or the remaining REs except for the rate-matched REs among the REs of the other PUCCH. Because the SR information is not combined with the UCI, the SR information is mapped to the punctured/rate-matched REs without being jointly encoded with the UCI. The BS configures SR resources and a PUCCH resource for the UE and indicates/configures a PUCCH transmission in the PUCCH resource to the UE by scheduling or the like, thus having knowledge of the number and positions of SR resources overlapping with the PUCCH resource. Accordingly, the BS may also have knowledge of the positions and number of REs punctured/rate-matched for the SR information among the REs of the PUCCH resource. In this manner, the BS may obtain the SR information based on a signal received in the punctured/ rate-matched even before completing decoding of a PUCCH received in the PUCCH resource.

Figure 15:
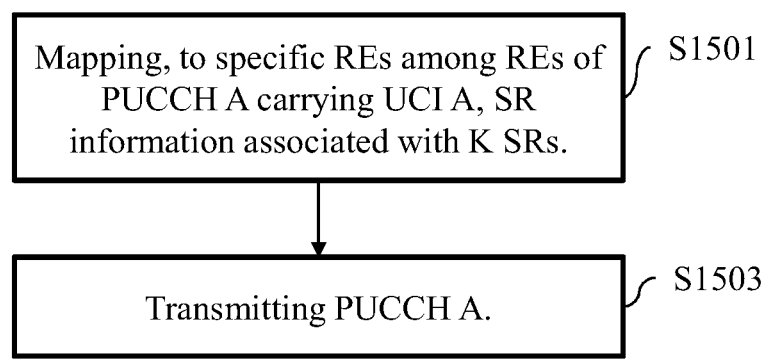
FIG. 15 illustrates an exemplary method of transmitting a UL signal by a communication device according to an example of the present disclosure.

FIG. 15 illustrates an exemplary method of transmitting a UL signal by a communication device according to an example of the present disclosure.

The communication device may receive one or more SR configurations from the network. When K SR PUCCHs based on the one or more SR configurations overlap with a PUCCH (hereinafter, referred to as PUCCH A) carrying other UCI (hereinafter, referred to as UCI A) in time or in time and frequency, the communication device maps SR information representing respective SRs associated with the K SR PUCCHs by puncturing or rate-matching specific REs among REs of PUCCH A, instead of combining the SR information with the other UCI and mapping the combined UCI to REs of PUCCH A after channel coding and modulation (S1501). The positions, number, and/or duration of the specific REs may be determined based on the K SR PUCCHs. The communication device may puncture or rate-match the specific REs according to the UCI type of UCI A. For example, when UCI A is HARQ-ACK information, the communication device rate-matches the specific REs to protect the HARQ-ACK information and maps the SR information to the rate-matched REs. When UCI A is CSI, the communication device punctures the specific REs and maps the SR information to the punctured REs.

The communication device transmits PUCCH A carrying the SR information in the specific REs among the REs of PUCCH A (S1503). The remaining REs except for the specific REs among the REs of the PUCCH A carry UCI A.

The communication device of the present disclosure includes at least one processor; and at least one computer memory operatively coupled to the at least one processor and storing instructions which when executed, cause the at least one processor to perform operations according to the example(s) of the present disclosure.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method of transmitting a scheduling request (SR) by a communication device in a wireless communication system, the method comprising:
   in a state in which a plurality of SR resources for a plurality of SRs overlap with a physical uplink control channel (PUCCH) including uplink control information (UCI) in a time domain, mapping the plurality of SRs to specific resource elements (REs) among a plurality of REs configured for transmitting the PUCCH; and
   transmitting the PUCCH to which the plurality of SRs are mapped,
   wherein the plurality of SRs are mapped to the specific REs in decreasing order of a time index of the specific REs from an RE having a highest time index among the specific RE.

2. The method according to claim 1, wherein mapping the plurality of SRs to the specific REs comprises puncturing the specific REs among the REs configured for the PUCCH and mapping the plurality of SRs to the punctured REs.

3. The method according to claim 1, wherein mapping the plurality of SRs comprises:
   in a state in which the UCI is hybrid automatic repeat request-acknowledgment (HARQ-ACK) information, rate-matching the specific REs and mapping the plurality of SRs to the rate-matched REs; and
   in a state in which the UCI is channel state information (CSI), puncturing the specific REs and mapping the plurality of SRs to the punctured REs.

4. A communication device for transmitting a scheduling request (SR) in a wireless communication system, the communication device comprising:
   at least one transceiver;
   at least one processor; and
   at least one computer memory operatively coupled to the at least one processor and storing instructions which when executed, cause the at least one processor to perform operations comprising:
   in a state in which a plurality of SR resources for a plurality of SRs overlap with a physical uplink control channel (PUCCH) including uplink control information (UCI) in a time domain, mapping the plurality of SRs to specific resource elements (REs) among a plurality of REs configured for transmitting the PUCCH; and
   transmitting the PUCCH to which the plurality of SRs are mapped through the at least one transceiver,
   wherein the plurality of SRs are mapped to the specific REs in decreasing order of a time index of the specific REs from a RE having a highest time index among the specific RE.

5. The communication device according to claim 4, wherein mapping the plurality of SRs to the specific REs comprises puncturing the specific REs among the REs configured for the PUCCH and mapping the plurality of SRs to the punctured REs.

6. The communication device according to claim 4, wherein mapping the plurality of SRs to the specific REs comprises:
   in a state in which the UCI is hybrid automatic repeat request-acknowledgment (HARQ-ACK) information, rate-matching the specific REs and mapping the plurality of SRs to the rate-matched REs; and
   in a state in which the UCI is channel state information (CSI), puncturing the specific REs and mapping the plurality of SRs to the punctured REs.

7. The communication device according to claim 4, wherein the communication device includes an autonomous driving vehicle communicable with at least a user equipment (UE), a network, or another autonomous driving vehicle other than the communication device.

* * * * *